US008494942B2

(12) United States Patent
Jasper et al.

(10) Patent No.: US 8,494,942 B2
(45) Date of Patent: Jul. 23, 2013

(54) IDENTIFYING AND SHARING COMMON TRENDS

(75) Inventors: Robert Jasper, Sammamish, WA (US); Shawn Rutledge, Seattle, WA (US)

(73) Assignee: First Data Corporation, Greenwood Village, CO (US)

( * ) Notice: Subject to any disclaimer, the term of this patent is extended or adjusted under 35 U.S.C. 154(b) by 647 days.

(21) Appl. No.: 12/354,078

(22) Filed: Jan. 15, 2009

(65) Prior Publication Data
US 2010/0179858 A1  Jul. 15, 2010

(51) Int. Cl.
*G06Q 40/00* (2012.01)
(52) U.S. Cl.
USPC ............ 705/36 R; 705/7.29; 705/14.41; 705/14.58
(58) Field of Classification Search
USPC .............. 705/7.29, 14.41, 14.58, 36 R
See application file for complete search history.

(56) References Cited

U.S. PATENT DOCUMENTS

| | | | | |
|---|---|---|---|---|
| 5,692,107 A * | 11/1997 | Simoudis et al. | ............... | 706/12 |
| 5,794,207 A * | 8/1998 | Walker et al. | ................... | 705/77 |
| 5,819,226 A * | 10/1998 | Gopinathan et al. | ............ | 705/44 |
| 5,822,741 A * | 10/1998 | Fischthal | ......................... | 706/16 |
| 6,026,397 A * | 2/2000 | Sheppard | ............................. | 1/1 |
| 6,029,154 A * | 2/2000 | Pettitt | ............................. | 705/44 |
| 6,122,624 A * | 9/2000 | Tetro et al. | ..................... | 705/44 |
| 6,601,048 B1 * | 7/2003 | Gavan et al. | .................... | 706/10 |
| 6,647,379 B2 * | 11/2003 | Howard et al. | ................. | 706/25 |
| 7,089,592 B2 * | 8/2006 | Adjaoute | ........................ | 726/25 |

* cited by examiner

*Primary Examiner* — Daniel Felten
(74) *Attorney, Agent, or Firm* — Kilpatrick Townsend & Stockton LLP

(57) ABSTRACT

Embodiments of the present invention provide methods, systems, and machine-readable media for identifying and sharing common trends represented in a corpus of private information without revealing the private information. Identifying and sharing common trends can comprise reading a first set of private information and a second set of private information. The first set of private information can be compared to the second set of private information and common information between the first set of private information and the second set of private information can be identified. Once identified, a determination can be made as to whether the identified common information represents an emerging trend, i.e., the common information re-occurs or develops over time. In response to determining the identified common information represents an emerging trend, the emerging trend can be reported without revealing the first set of private information or the second set of private information.

27 Claims, 5 Drawing Sheets

IDENTIFYING AND SHARING COMMON TRENDS

BACKGROUND OF THE INVENTION

Embodiments of the present invention generally relate to managing information. More specifically, embodiments of the present invention relate to methods and systems for identifying and sharing common trends represented in a corpus of private information without revealing the private information.

An entity providing a hosted service for a plurality of users or customers can maintain a collection of information related to or associated with those users. For example, an acquirer, financial institution, or other entity can provide services supporting a variety of different financial transactions. In order to support these transactions, the acquirer can also maintain a wide range of information for users or customers participating in those transactions such as financial institutions, merchants, and/or other parties to the transactions. Such information can include information about the transactions themselves as well as information such as rules for processing those transactions. Such rules or other information for supporting the transactions can be defined by parties such as financial institutions, merchants, or other entities participating in the transactions. Most of this information is private and/or proprietary and can not to be shared between users or customers of the service.

However, if the entity maintaining such information, e.g., an acquirer, is able to look across the collection of information as a whole, that entity may be able to gain insight into emerging trends represented in the collection of information. Furthermore, even abstracted information related to this insight, without details of the private information from which it is formed, may be helpful to users or customers of the service. That is, a notice of the trend, even in the abstract and without sharing the details of the private information, may be useful. Hence, there is a need in the art for improved methods and systems for identifying and sharing common trends represented in a corpus of private information without revealing the private information.

BRIEF SUMMARY OF THE INVENTION

Methods, systems, and machine-readable media are disclosed for identifying and sharing common trends represented in a corpus of private information without revealing the private information. According to one embodiment, a method identifying common trends represented in a corpus of information can comprise reading a first set of private information from the corpus of information and reading a second set of private information from the corpus of information. The first set of private information can be associated with a first entity and the second set of private information can be associated with a second entity. For example, the first set of private information and the second set of private information comprise a first set of proprietary rules and a second set of proprietary rules such as rules for detecting fraud in a financial transaction, rules for authorizing a financial transaction, rules for increasing a credit line, rules for decreasing a credit line, etc.

The first set of private information can be compared to the second set of private information and common information between the first set of private information and the second set of private information can be identified. For example, each of the first set of private information and the second set of private information can be placed into a canonical form. In such a case, comparing the first set of private information and the second set of private information can comprise comparing the canonical forms or the first set of private information and the second set of private information. Further, identifying common information between the first set of private information and the second set of private information can comprise identifying recurring patterns in the canonical forms or the first set of private information and the second set of private information.

Once identified, a determination can be made as to whether the identified common information represents an emerging trend. For example, results of said comparing the first set of information to the second set of information can be recorded. In such a cases, determining whether the identified common information represents an emerging trend can be based at least in part on previously recorded results of said comparing the first set of private information to the second set of private information.

In response to determining the identified common information represents an emerging trend, the emerging trend can be reported without revealing the first set of private information or the second set of private information. Reporting the emerging trend can comprise reporting the emerging trend to the first entity and the second entity. In some cases, the emerging trend can additionally or alternatively be reported to a third entity. Reporting can be provided by a hosted service. For example, the hosted service can be provided by an acquirer for a plurality of financial transactions that maintains the first set of private information and the second set of private information.

According to another embodiment, a system can comprise a corpus of information comprising a first set of private information associated with a first entity and a second set of private information associated with a second entity. For example, the first set of private information and the second set of private information can comprise a first set of proprietary rules and a second set of proprietary rules. A host can be communicatively coupled with the corpus of information. The host can comprise, for example, an acquirer system adapted to support a plurality of financial transactions and maintain the corpus of information. The host can be adapted to read the first set of private information, read the second set of private information, compare the first set of private information to the second set of private information, and identify common information between the first set of private information and the second set of private information.

The host can be further adapted to determine whether the identified common information represents an emerging trend. For example, the host can be adapted to record results of said comparing the first set of information to the second set of information. In such a case, the host can determine whether the identified common information represents an emerging trend based at least in part on previously recorded results of said comparing the first set of private information to the second set of private information. The host can be further adapted to report the emerging trend without revealing the first set of private information or the second set of private information.

According to yet another embodiment, a machine-readable medium can have stored thereon a series of instructions which, when executed by a processor, cause the processor to identify common trends in a corpus of information by reading a first set of private information from the corpus of information and reading a second set of private information from the corpus of information. The first set of private information can be associated with a first entity and the second set of private information can be associated with a second entity. For example, the first set of private information and the second set of private information comprise a first set of proprietary rules and a second set of proprietary rules.

The first set of private information can be compared to the second set of private information and common information between the first set of private information and the second set of private information can be identified. A determination can be made as to whether the identified common information represents an emerging trend. For example, results of said comparing the first set of information to the second set of information can be recorded. In such cases, determining whether the identified common information represents an emerging trend is based at least in part on previously recorded results of said comparing the first set of private information to the second set of private information. In response to determining the identified common information represents an emerging trend, the emerging trend can be reported without revealing the first set of private information or the second set of private information.

DETAILED DESCRIPTION OF THE INVENTION

Figure 1:
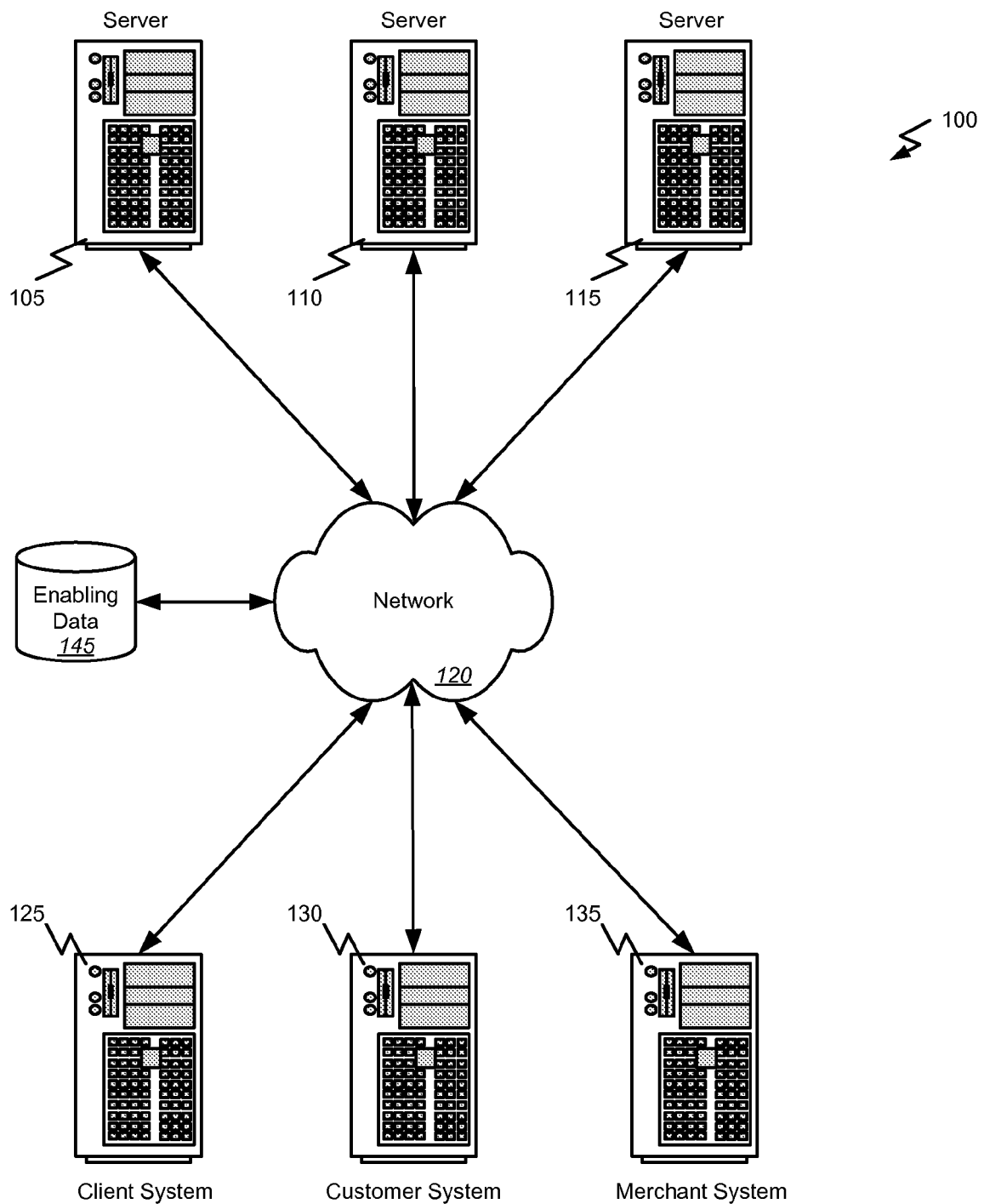
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions as well as other information related to one or more financial accounts. In some such embodiments, the processes are executed by an entity on behalf of one or more client organizations. The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "acquirer" refers to an entity that receives purchase transaction information from a merchant or other entity and, based on account identifier information, routes the transaction information over an electronic funds transfer network to an issuer of the account being used for payment.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for identifying and sharing common trends represented in a corpus of private information without revealing the private information. Identifying and sharing common trends can comprise reading a first set of private information from the corpus of information and reading a second set of private information from the corpus of information. The first set of private information can be associated with a first entity and the second set of private information can be associated with a second entity. For example, the first set of private information and the second set of private information comprise a first set of proprietary rules and a second set of proprietary rules such as rules for detecting fraud in a financial transaction, rules for authorizing a financial transaction, rules for increasing a credit line, rules for decreasing a credit line, etc. However, it should be understood that other types of information and services are contemplated and are considered to be within the scope of the present invention. For example, rather than rules related to financial information and/or transactions, embodiments of the present invention are thought to be applicable to and useful with any type private, proprietary, and/or sensitive information including but not limited to health care information, employee personal information, legal information, government information of various types, etc.

The first set of private information can be compared to the second set of private information and common information or patterns between the first set of private information and the second set of private information can be identified. Once identified, a determination can be made as to whether the identified common information represents an emerging trend, i.e., the common information re-occurs or develops over time. In response to determining the identified common information represents an emerging trend, the emerging trend can be reported without revealing the first set of private information or the second set of private information. Additional details of various embodiments of the present invention will be described below with reference to the figures.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc.

According to one embodiment, the enabling data 145 can include private and/or proprietary information for one or more clients, merchants, financial institutions, etc. This information can include, for example, sets of rules for processing financial transactions. Such rules can comprise a logical combination of one or more conditions and one or more associated actions to be performed upon satisfaction of the condition(s). As such, these rules can comprise and/or define rules for detecting fraud in a financial transaction, rules for authorizing a financial transaction, rules for increasing a credit line, rules for decreasing a credit line, etc. As will be described in detail below, one or more of the servers 105, 11, or 115 can be adapted to identify common trends within such rules or other information of the enabling data 145 and report such trends in an abstract form, i.e., without revealing the underlying data from which the trend was found, to one or more clients, merchants, etc.

Figure 2:
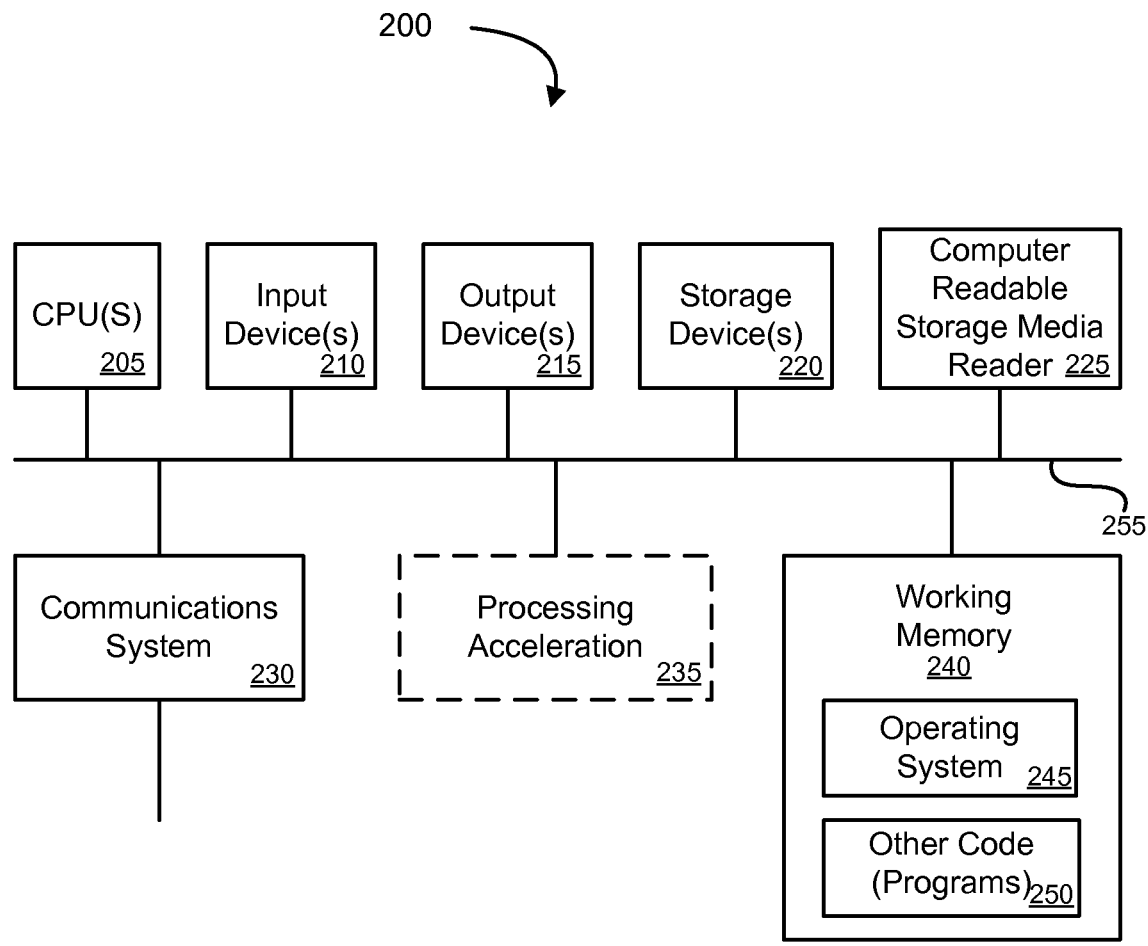
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
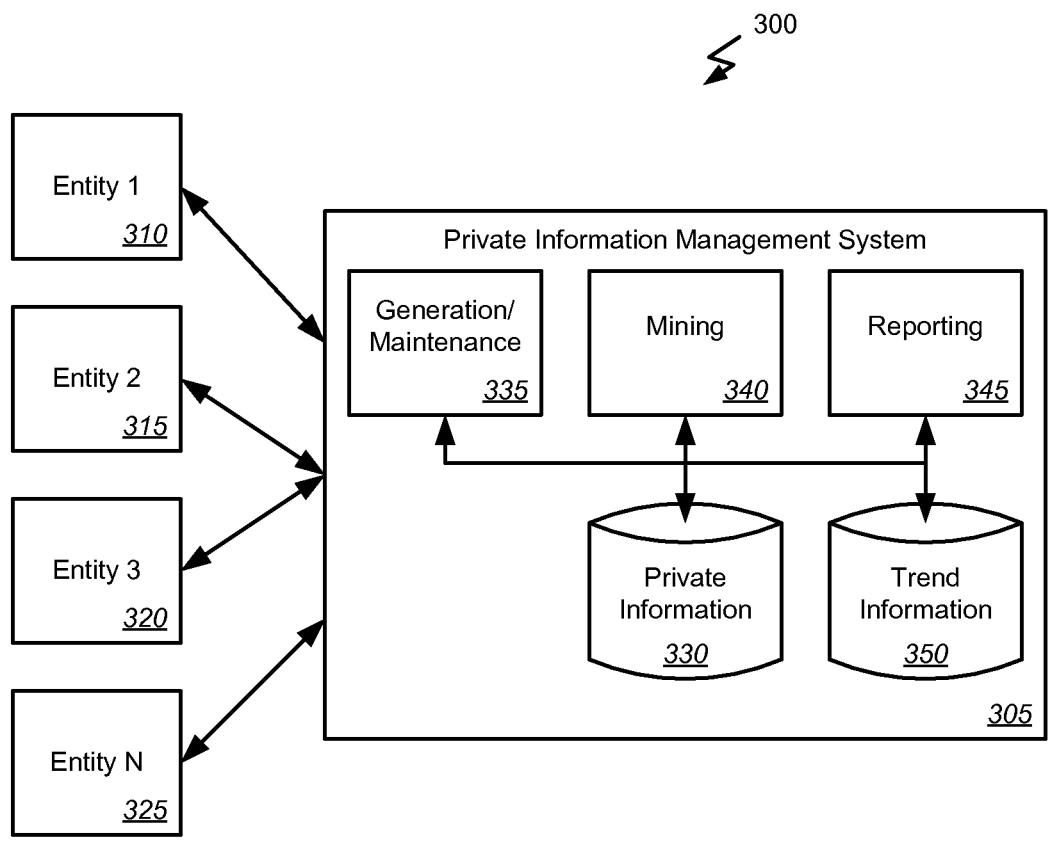
FIG. 3 is block diagram illustrating, at a high level, a system for identifying and sharing common trends represented in a corpus of private information according to one embodiment of the present invention.

FIG. 3 is block diagram illustrating, at a high level, a system for identifying and sharing common trends represented in a corpus of private information according to one embodiment of the present invention. As illustrated in this example, the system 300 can include a number of entities 310-325 such as client financial institutions, merchants, etc as described above. These entities 310-325 can be communicatively coupled with a private information management system 305 via a communication network (not shown here) such as a LAN, WAN, Internet or any other network as described above.

The private information management system 305 can comprise or be implemented on a server by an acquirer or other entity such as described above. Generally speaking, the private information management system 305 can implement a hosted service which maintains a set of private information 330 for one or more of the entities 310-325. As noted, this private information 330 can include but is not limited to one or more rules for detecting fraud in a financial transaction, rules for authorizing a financial transaction, rules for increasing a credit line, rules for decreasing a credit line, etc. However, it should be understood that other types of information and services are contemplated and are considered to be within the scope of the present invention. For example, rather than financial information, embodiments of the present invention are thought to be applicable to and useful with any type private, proprietary, and/or sensitive information including but not limited to health care information, employee personal information, legal information, government information of various types, etc. In short, any type of private information 330 may be maintained by the private information management system 305 on behalf of the entities 310-325, i.e., users of the service.

The private information management system 305, for example via generation and/or maintenance module 335, can be adapted to allow the entities 310-325 to generate and manage the private information 330 for that entity. For example, the generation and/or maintenance module 335 can provide an interface such as one or more web pages through which an entity can enter or otherwise define and/or update the private information 330. Such an interface may include or utilize authentication and access control features to maintain the propriety/privacy of the private information 330.

According to one embodiment, the private information management system 305 can include a mining module 340. Via the mining module 340, the private information management system 305 can be adapted to periodically, upon request, and/or upon the occurrence of some other condition, mine the private information 330 to identify common, emerging trends in or represented by the private information 330. For example, the private information 330 can comprise sets of rules defined by the entities 310-325, e.g., financial institutions, and that represent rules for detecting and/or handling fraudulent business transactions or activity. These rules can relate to handling transactions of particular types, from particular merchants, originating in a particular country, involving a specified range of transaction amount, and/or having any other of a number of different characteristics. The mining module 340 can compare these rules between different entities 310-325 to identify common patterns within the rules.

Once identified, such common patterns, or an indication thereof, can be saved in trend information 350 maintained by the private information management system 305. Based on this trend information 350, i.e., previously identified and saved common patterns, the private information management system 305 can determine whether the identified patterns represent an emerging trend, i.e., the patterns has re-occurred or become more common between the entities 310-325. If it is determined that the common patterns represent an emerging trend, the private information management system 305, for example via reporting module 345, can report the trend to one or more of the entities 310-325. For example, the reporting module 345 may provide an email, Instant Message, periodic electronic or paper report, or other report or notification indicating the emergence of the trend. As noted, the information in such a report need not include the private information 330 upon or from which the trend was identified. Rather, the report can include abstracted information indicating the trend. For example, such abstracted information can include but is not limited to a report indicating the number of new rules directed to transactions of a particular type, from a particular merchant, originating in a particular county, etc. However, the privacy/propriety of the actual rules can be maintained as the rules themselves need not be disclosed.

In this way, an entity that has not yet been affected by an emerging trend can react to the trend proactively based on the experiences of other entities. Thus, for example, when some of the entities 310-325 detect and react to new fraudulent activities by writing new rules for dealing with such activities, other entities can be informed that a trend has been detected. Further, the notification can include an abstracted indication of the trend such as an increased number of rules directed to particular types of transactions. The entities 310-325 can then begin to develop their own rules for handling similar transaction. Thus, based on this cooperative effort, some of the entities can learn from the experiences of the other entities and be proactive in their approach to emerging trends detected and reported by the private information management system 305.

Stated another way, the private information management system 305 can be adapted, for example via mining module 340, to read a first set of private information from a corpus of information, i.e., the private information 330 repository, and reading a second set of private information from the corpus of information 330. The first set of private information can be associated with a first entity 310 and the second set of private information can be associated with a second entity 315. For example, the first set of private information and the second set of private information comprise a first set of proprietary rules and a second set of proprietary rules such as rules for detecting fraud in a financial transaction, rules for authorizing a financial transaction, rules for increasing a credit line, rules for decreasing a credit line, etc.

The first set of private information can be compared to the second set of private information and common information between the first set of private information and the second set of private information can be identified. For example, each of the first set of private information and the second set of private information can be placed into a canonical form. In such a case, comparing the first set of private information and the second set of private information can comprise comparing the canonical forms or the first set of private information and the second set of private information. Further, identifying common information between the first set of private information and the second set of private information can comprise identifying recurring patterns in the canonical forms or the first set of private information and the second set of private information.

Once identified, a determination can be made as to whether the identified common information represents an emerging trend. For example, results of said comparing the first set of information to the second set of information can be recorded, for example in trend information 350. In such a cases, determining whether the identified common information represents an emerging trend can be based at least in part on previously recorded and saved results of said comparing the first set of private information to the second set of private information, i.e., the trend information 350.

In response to determining the identified common information represents an emerging trend, the emerging trend can be reported, for example via reporting module 345, without revealing the first set of private information or the second set of private information. Reporting the emerging trend can comprise reporting the emerging trend to the first entity 310 and the second entity 315. In some cases, the emerging trend can additionally or alternatively be reported to a third entity 320. That is, the trend can be reported to some or all of the entities 310-325 based on a number of conditions including but not limited to agreements between the entities and/or the hosted service (e.g., the acquirer), fees paid by the entities 310-325, information submitted by the entities 310-325, etc.

Figure 4:
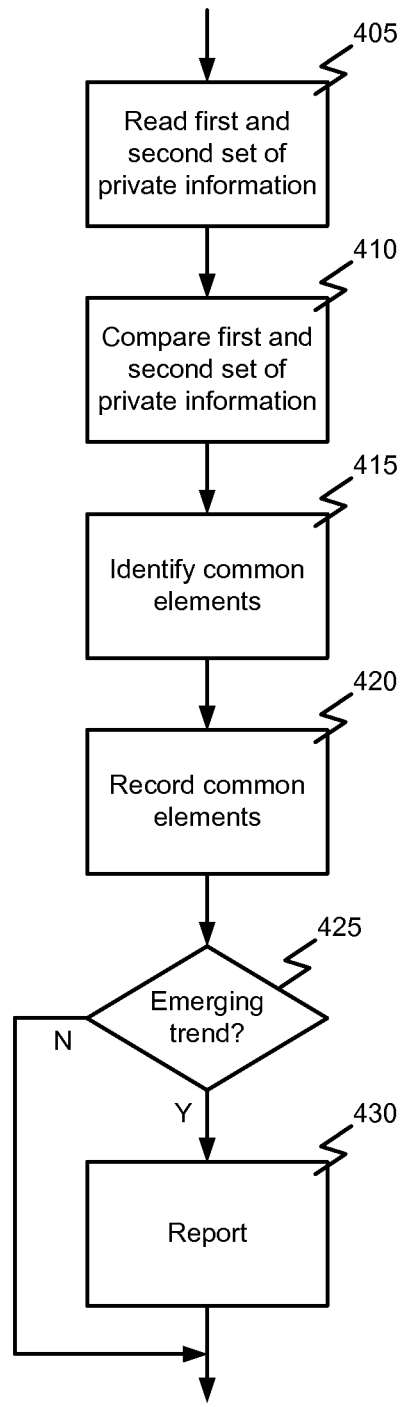
FIG. 4 is a flowchart illustrating a process for identifying and sharing common trends represented in a corpus of private information according to one embodiment of the present invention.

FIG. 4 is a flowchart illustrating a process for identifying and sharing common trends represented in a corpus of private information according to one embodiment of the present invention. In this example, processing begins with reading 405 a first set of private information and a second set of private information. The first set of private information can be associated with a first entity and the second set of private information can be associated with a second entity. For example, the first set of private information and the second set of private information comprise a first set of proprietary rules and a second set of proprietary rules such as rules for detecting fraud in a financial transaction, rules for authorizing a financial transaction, rules for increasing a credit line, rules for decreasing a credit line, etc. For example, a fraud rule can be formalized as a 2-tuple composed of a pattern p∈P and action a∈A. Actions can be symbols, representing what action to take if a transaction matches the pattern (e.g., approve the transaction, reject the transaction, send to the fraud work center).

Figure 5:
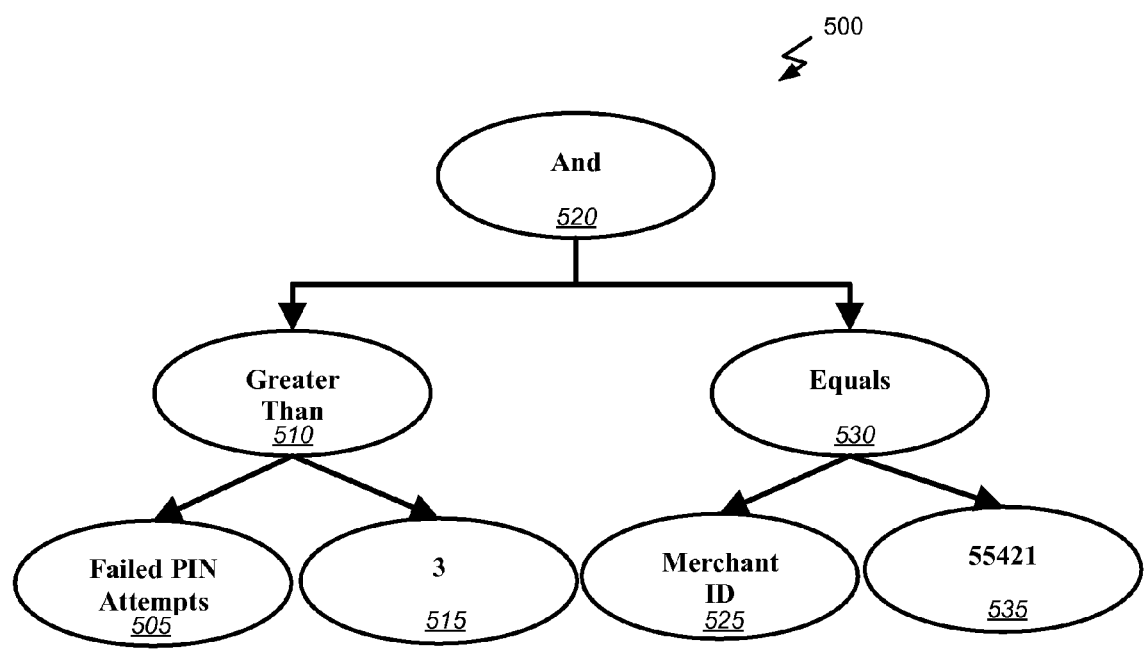
FIG. 5 is a block diagram illustrating a tree structure representation of an exemplary rule to which embodiments of the present invention may be applied.

Patterns can be considered or represented as trees such as illustrated by FIG. 5. FIG. 5 is a block diagram illustrating a tree structure representation of an exemplary rule to which embodiments of the present invention may be applied. More specifically, FIG. 5 can represent the exemplary rule expressed as:

Number of Failed PIN Attempts is Greater than 3 and the Merchant ID is 55421

In this example, the tree 500 is composed of a set of labeled nodes (vertices) 505-535 and edges, representing matching logic over transactions. Such a tree 500 could take the form of formal language statements (e.g., parse tree) or decision trees. As will be discussed below, two patterns p and p' can be considered equal, p=p' if their corresponding graphs are the same (equal).

Returning to FIG. 4, the first set of private information can be compared 410 to the second set of private information and common information between the first set of private information and the second set of private information can be identified 415. For example, each of the first set of private information and the second set of private information can be placed into a canonical form. In such a case, comparing 410 the first set of private information and the second set of private information can comprise comparing the canonical forms or the first set of private information and the second set of private information. Further, identifying 415 common information between the first set of private information and the second set of private information can comprise identifying 415 recurring patterns in the canonical forms or the first set of private information and the second set of private information.

As noted above, two patterns p and p' can be considered equal, p=p' if their corresponding graphs are the same (equal). For example, let $S:P,P \rightarrow \{true, false\}$ represent a predicate over patterns indicating whether two patterns are semantically equivalent. The patterns can be placed in a canonical form such that $S(p, p') \leftrightarrow p=p'$. This can be accomplished, for example, via tree-rewriting routines that convert trees into a canonical form. Further, d can represent a set of patterns in a database or other repository. In this case, $D=\{d_1, d_2, \ldots d_m\}$ can represent the set of databases that are subject to mining. Let $P=\{p_1, p_2, \ldots, p_m\}$ represent the set of all patterns found in databases contained in D such that:

$$P = \bigcup_{d_j \in D} d_j$$

By definition $d \subset P$. Because semantically equivalent patterns are equal, the patterns in P are also semantically distinct.

In the example of fraud, it can be assumed that each customer institution has a database of such patterns extracted from their fraud rules.

According to one embodiment, identifying 415 common information between the first set of private information and the second set of private information can comprise finding patterns based on exact matches. For example, let M(p,d) be a matching function indicating whether pattern p is found in database d, such that:

$$M(p, d) = \begin{cases} 1 & \text{if } p \in d \\ 0 & \text{if } p \notin d \end{cases}$$

Further, let $M_{sum}(p,D)$ represent the number of databases in which pattern p appears (also known as the level of support for pattern p) such that:

$$M_{sum}(p, D) = \sum_{d_j \in D} M(p, d_j)$$

Patterns can then be found such that $M_{sum}(p,D) \geq s_m$, where $s_m$ represents the minimum level of support. Let $M_{set}(P,D,s_m)$ represent the set of patterns that meet this level of support, such that: $M_{set}(P,D,s_m) = \{p | p \in P \wedge M_{sum}(p,D) \geq s_m\}$. Note that decreased levels of support will lead to at least as many patterns and generally more patterns, therefore: $s < s' \rightarrow |M_{set}(P,D,s)| \geq |M_{set}(P,D,s')|$.

To illustrate an exemplary match, let $D = \{d_1, d_2, d_3\}$ represent the fraud rules databases for three institutions such that:

$d_1 = \{p_1, p_3, p_5\}$ $d_2 = \{p_2, p_3, p_5\}$ $d_3 = \{p_1, p_3, p_4\}$ and $P = \{p_1, p_2, p_3, p_4, p_5\}$ The level of support associated with each expression is as follows:

$M_{sum}(p_1,D)=2, M_{sum}(p_2,D)=1, M_{sum}(p_3,D)=3,$ $M_{sum}(p_4,D)=1, M_{sum}(p_5,D)=2$ Therefore: $M_{set}(P,D,2) = \{p_1, p_3, p_5\}$ Given that patterns are defined by humans, it's unlikely that patterns will match exactly. Therefore, identifying 415 common information between the first set of private information and the second set of private information can additionally or alternatively comprise finding or identifying partial matches that may also be indicators of emerging fraud patterns. A subpattern, which is also a pattern, can be considered such that pattern p' is a subpattern of pattern p, $p' \prec p$, if the graph representing p' is a subgraph of p. Note that a proper subset is not required. Therefore $p \prec p$. For example, let p be a pattern as represented by the tree 500 illustrated in FIG. 5. Further, p' be a pattern represented by the nodes 525-535 of the tree 500 in FIG. 5. Then $p' \prec p$ because the graph representing p' is a subgraph of p.

For example, let Sub(P) represent the set of all subpatterns of P, such that:

$Sub(P) = \{p' | p \in P \wedge p' \prec p\}$

Further, let PM(p',d) be an indicator of whether subpattern p' can be found in a pattern in database d, such that:

$$PM(p', d) = \begin{cases} 1 & \text{if } \exists (p)(p \in d \wedge p' \prec p) \\ 0 & \text{otherwise} \end{cases}$$

Let $PM_{sum}(p',D)$ represent the number of databases in which subpattern p' is found, such that:

$$PM_{sum}(p', D) = \sum_{d_j \in D} PM(p', d_j)$$

Let $PM_{set}(P,D,s_{pm})$ represent the set of all subpatterns that occur in at least $s_{pm}$ databases in D, such that:

$PM_{set}(P,D,s_{pm}) = \{p' | p' \in Sub(P) \wedge PM_{sum}(p',D) \geq s_{pm}\}$ Because $p \prec p$ the number of subpatterns is at least as large as the number of total patterns, therefore $M_{set}(P,D,s) \subseteq PM_{set}(P,D,s)$.

Regardless of whether based on exact matches or partial matches, results of comparing 410 the first set of private information and the second set of private information and identifying 415 common information between the first set of private information and the second set of private information can be recorded 420. A determination 425 can be made as to whether the identified common information represents an emerging trend. For example, determining 420 whether the identified common information represents an emerging trend, i.e., re-occurs or develops over time, can be based at least in part on previously recorded 420 results. In response to determining 425 the identified common information represents an emerging trend, the emerging trend can be reported 430 without revealing the first set of private information or the second set of private information.

According to one embodiment, determining 420 whether the identified common information represents an emerging trend can be based on the number of transactions that a pattern matches. For example, let t denote a transaction where $t \in T$. Further, let T represent transactions across all customer institutions and let TM(t,p) be a function indicating whether a transaction matches a specified pattern, such that:

$$TM(t, p) = \begin{cases} 1 & \text{if } t \text{ matches } p \\ 0 & \text{otherwise} \end{cases}$$

It should be understood that it is not critical how this matching occurs, only that it can be determined whether a transaction matches a particular pattern. Further, let $TM_{sum}(T,p)$ represent the number of transactions in T, that match pattern p, such that:

$$TM_{sum}(T, p) = \sum_{t_j \in T} TM(t_j, p)$$

This can provide some measure of the usefulness of the pattern, in that patterns that don't match any known transaction may not be as interesting as patterns that match numerous transactions. Therefore, in some cases, a minimal level of support $s_{tm}$ on the minimum number of matching transactions can be defined. For example, let $TM_{set}(T,P,D,s_{pm},s_{tm})$ represent the set of patterns that meet the support thresholds $s_{pm}$, $s_{tm}$, such that:

$$TM_{set}(T,P,D,s_{pm},s_{tm})= \{p'|p' \in PM_{set}(P,D,s_{pm}) \wedge TM_{sum}(T,p') \geq s_{tm}\}$$

For applications such as fraud, activity level along may $TM_{set}$ can provide an useful set of interesting patterns, but may include many trivial and therefore potentially non-interesting patterns. Therefore, according to one embodiment, size of a pattern can serve as a proxy for pattern complexity. For example, let Size(p) represent the size of a pattern, as measured by the number of nodes. A mechanism for generating a set of patterns that are larger than a specified size threshold can be set. For example, let $Size_{set}(T,P,D,s_{pm},s_z)$ represent the number of subpatterns that are larger than $s_z$, but also occur in at least $s_{pm}$ databases, such that:

$$Size_{set}(T,P,D,s_{pm},s_z)= \{p'|p' \in PM_{set}(P,D,s_{pm}) \wedge Size(p') \geq s_z\}$$

According to one embodiment, the notions of size and activity can be combined to filter for high activity patterns of a minimum size. For example, let $TMSize_{set}$, represent the set of sub-patterns satisfying minimal size and activity thresholds, such that:

$$TMSize_{set}(T,P,D,s_{pm},s_z,s_{tm})=\{p'|p' \in PM_{set}(P,D,s_{pm}) \wedge Size(p') \geq s_z \wedge TM_{sum}(T,p') \geq s_{tm}\}$$

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method of identifying common trends represented in a corpus of information, the method comprising:

reading, by a computer, a first set of private information from the corpus of information stored in a memory system, the first set of private information associated with a first entity, and comprising a first set of proprietary rules for processing a first plurality of transactions at the first entity;

reading, by the computer, a second set of private information from the corpus of information stored in the memory system, the second set of private information associated with a second different, entity and comprising a second set of proprietary rules for processing a second plurality of transactions at the second, different entity; and comparing, by the computer, the first set of private information to the second set of private information in order to identify common information between the first set of private information and the second set of private information, without revealing the first set of private information or the second set of private information.

2. The method of claim 1, wherein the first set of proprietary rules and the second set of proprietary rules comprise rules for detecting fraud in a financial transaction.

3. The method of claim 1, wherein the first set of proprietary rules and the second set of proprietary rules comprise rules for authorizing a financial transaction.

4. The method of claim 1, wherein the first set of proprietary rules and the second set of proprietary rules comprise rules for increasing a credit line.

5. The method of claim 1, wherein the first set of proprietary rules and the second set of proprietary rules comprise rules for decreasing a credit line.

6. The method of claim 1, further comprising determining, by a computer, whether the identified common information represents an emerging trend, based on identified common information re-occurring over time.

7. The method of claim 6, further comprising recording results of said comparing the first set of information to the second set of information.

8. The method of claim 7, wherein determining whether the identified common information represents an emerging trend is further based at least in part on previously recorded results of said comparing the first set of private information to the second set of private information.

9. The method of claim 6, further comprising, in response to determining the identified common information represents an emerging trend, reporting the emerging trend without revealing the first set of private information or the second set of private information.

10. The method of claim 9, wherein reporting the emerging trend comprise reporting the emerging trend to the first entity and the second entity.

11. The method of claim 10, further comprising reporting the emerging trend to a third entity.

12. The method of claim 9, wherein said reporting is provided by a hosted service.

13. The method of claim 12, wherein the hosted service is provided by an acquirer for a plurality of financial transactions and wherein the acquirer maintains the first set of private information and the second set of private information.

14. The method of claim 1, further comprising converting each of the first set of private information and the second set of private information into a canonical form.

15. The method of claim 14, wherein comparing the first set of private information and the second set of private information comprise comparing the canonical forms or the first set of private information and the second set of private information.

16. The method of claim 15, wherein identifying common information between the first set of private information and the second set of private information comprises identifying recurring patterns in the canonical forms or the first set of private information and the second set of private information.

17. A system comprising:

a corpus of information comprising a first set of private information associated with a first entity and a second set of private information associated with a second, different entity, wherein the first set of private information comprises a first plurality of proprietary rules for processing transactions at the first entity and the second set of private information comprises, a second plurality of proprietary rules for processing transactions at the second entity;

a host communicatively coupled with the corpus of information and configured to read the first set of private information, read the second set of private information, and to compare the first set of private information to the second set of private information in order to identify common information between the first set of private information and the second set of private information, without revealing the first set of private information and the second set of private information.

18. The system of claim 17, wherein the host is further configured to determine whether the identified common information represents an emerging trend, based on identified common information re-occurring over time.

19. The system of claim 18, wherein the host is further configured to record results of said comparing the first set of information to the second set of information and determine whether the identified common information represents an emerging trend based at least in part on previously recorded results of said comparing the first set of private information to the second set of private information.

20. The system of claim 18, wherein the host is further configured to report the emerging trend without revealing the first set of private information or the second set of private information.

21. The system of claim 17, wherein the host comprises an acquirer system configured to support a plurality of financial transactions and maintain the corpus of information.

22. A machine-readable medium having stored thereon a series of instructions which, when executed by a processor, cause the processor to identify common trends in a corpus of information by:

reading a first set of private information from the corpus of information, the first set of private information associated with a first entity;

reading a second set of private information from the corpus of information, the second set of private information associated with a second, different entity;

wherein the first and second sets of private information each comprise a plurality of proprietary rules for processing transactions at the first and second entities, respectively; and comparing the first set of private information to the second set of private information-in order to identify common information between the first set of private information and the second set of private information, without revealing the first set of private information and the second set of private information.

23. The machine-readable medium of claim 22, further comprising determining whether the identified common information represents an emerging trend, based on identified common information re-occurring over time.

24. The machine-readable medium of claim 23, further comprising recording results of said comparing the first set of information to the second set of information.

25. The machine-readable medium of claim 24, wherein determining whether the identified common information represents an emerging trend is further based at least in part on previously recorded results of said comparing the first set of private information to the second set of private information.

26. The machine-readable medium of claim 23, further comprising, in response to determining the identified common information represents an emerging trend, reporting the emerging trend without revealing the first set of private information or the second set of private information.

27. A computer-implemented method of identifying common trends represented in a corpus of information stored in a memory system, the method comprising:

reading, by a computer, a first set of private information from the corpus of information stored in the memory system, the first set of private information associated with a first entity and comprising proprietary information relating to a first plurality of rules for processing financial transactions at the first entity;

reading, by the computer, a second set of private information from the corpus of information stored in the memory system, the second set of private information associated with a second, different entity and comprising proprietary information relating to a second plurality of rules for processing financial transactions at the second entity;

comparing, by the computer, the first set of private information to the second set of private information in order to identify common information between the first set of private information and the second set of private information;

recording at the memory system, by the computer, results of said comparing the first set of information to the second set of information;

determining, by the computer, whether the identified common information represents an emerging trend based at least in part on previously recorded results of said comparing and on patterns of common information over time; and reporting the emerging trend without revealing the first set of private information or the second set of private information.

* * * * *